May 27, 1941.  G. A. OVERSTROM ET AL  2,243,679
VIBRATING SCREEN
Filed May 13, 1939
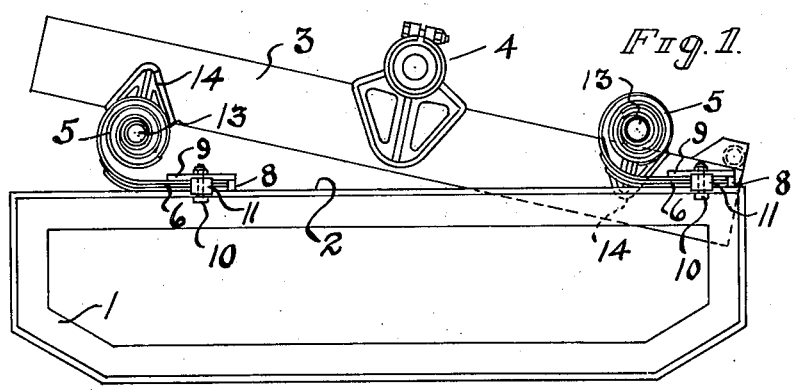
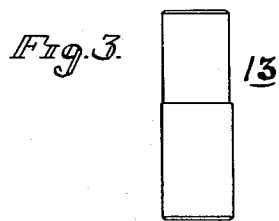
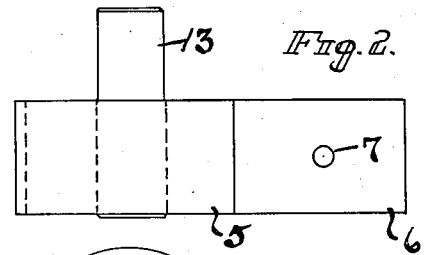
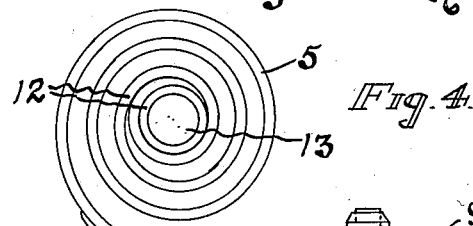
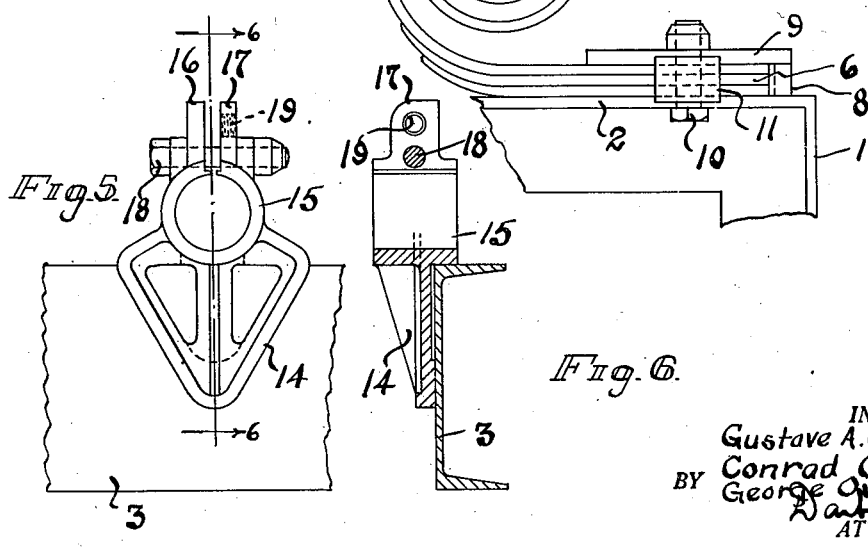
INVENTOR.
Gustave A. Overstrom
Conrad Overstrom
BY George Overstrom
ATTORNEYS.

Patented May 27, 1941

2,243,679

UNITED STATES PATENT OFFICE 2,243,679

VIBRATING SCREEN

Gustave A. Overstrom and George Overstrom, Eagle Rock, and Conrad Overstrom, Pasadena, Calif.

Application May 13, 1939, Serial No. 273,438

1 Claim. (Cl. 209—415)

This invention relates to improvements in vibrating screens such as are used for screening materials of various kinds, grading, sorting, and the like.

The invention is particularly concerned with improvements in the manner of mounting and securing the supporting springs which are interposed between the base and the screen box and particularly of the involutely coiled type.

A general object of the invention is to provide a simple mounting and attaching means for springs of this type so that the connections between the springs are strong and rigid and free of looseness while leaving the spring throughout its useful length unrestrained.

Another object of the invention is to provide supporting and attaching means for springs of this type which may be readily and quickly loosened so that the spring may be detached in the field for repair or replacement.

The many detailed objects of this invention which are successfully secured by means of the construction herein disclosed will be apparent from the following description.

This invention resides substantially in the construction, combination, arrangement and relative locating of parts, all as will be described in full detail below.

In the accompanying drawing, in which the same reference numerals have been used throughout, to indicate the same or similar parts, Figure 1 is a side elevational view, somewhat simplified, of a vibrating screen employing the construction of this invention;

Figure 2 is a top plan view of one of the supporting spring assemblies;

Figure 3 is a plan view of one of the spring stub shafts;

Figure 4 is a side elevational view of the structure of Figure 2;

Figure 5 is a side elevational view of one of the screen box supports for the spring; and Figure 6 is a cross-sectional view taken on the line 6—6 of Figure 5.

In accordance with the present practice, it is usual to mount and secure involutely coiled springs when employed for the purpose of supporting a vibratory screen on a base on pintles which are supported by brackets directly secured to the screen box. The pintles are adapted to receive the springs at their centers or hubs by passing therethrough and in order to facilitate their mounting and removal the fit therebetween is relatively loose. The springs are held on the pintles by means of nuts which engage the sides of the springs and clamp them between the nuts and the brackets. It is necessary to very tightly apply these nuts in order to compensate for the fact that the springs have a relatively loose fit on the pintles. The result is that the innermost turns of the springs are frequently constrained, thereby impairing the efficiency of the springs for their intended purpose and at times tending to shorten the life thereof by reason of the stresses caused therein. If the springs are made sufficiently tight on the pintles so that the nuts need not be drawn up so much, it is quite difficult to apply the springs to the pintles and remove them in the field. This difficulty is enhanced by the fact that these screens are often employed under difficult conditions, such as in the screening of rotary mud which collects on the screen parts. The presence of the dried mud or other abrasive materials contributes to the difficulty of removing tightly-fitted springs.

It is a general object of this invention to overcome these difficulties by employing a stub shaft which is tightly and permanently fitted to the springs at their center so as to form a single unit which may be mounted in place and removed without requiring a separation of the stub from the spring. As a further object of the invention, the fixtures for attaching the stub to the screen box and the tail of the spring to the base have been simplified so that these operations are easily effected in the field.

Referring to the drawing, there is shown somewhat diagrammatically in Figure 1 a form of vibrating screen to which the invention hereof may be applied. It is illustrated as including a base 1 which may consist of a pair of cross-braced angle iron frames, one of which appears in the drawing. When built up of angle irons the top flange 2 of the upper angle iron forms a platform on which the screen box supporting springs are attached. The screen box is diagrammatically illustrated at 3 and consists usually of an open framework having a detachable screening member mounted in the bottom thereof. Mounted on the screen member is illustrated diagrammatically an unbalanced rotatable weight mechanism 4 for effecting vibratory movements of the screen box.

The screen box 3 is supported from the base 1 by means of involutely coiled springs 5, one for each side of the box near each end. As illustrated, these springs have a more or less tangentially extending tail 6 which is commonly built up of several leaves, as illustrated in the drawing. The tails of the springs are provided with a hole 7 therethrough by means of which they are secured to the base. In the form of structure illustrated the base on the top flange 2 is provided with stops or positioning bars 8. These may be simply rectangular bars extending across the flange and welded thereto in proper position. The tails of the spring rest on the flange 2 with the terminal ends abutting against the blocks 8. Thus it will be seen that the blocks serve as a seating or indexing means to aid in properly positioning the springs. A clamp plate 9 lies on the upper surface of each spring tail overlapping the block 8 in each case and held in place by means of a bolt and nut 10 which passes through the flange 2, the tail 6, and the clamping plate 9. In order to aid in positioning these parts a block or arm 11 may be employed which may either be welded to the side edge of the flange or to the side edge of the clamp plate so that the spring tails may be indexed not only longitudinally against the blocks 8 but transversely against the blocks 11. Thus by means of the single bolt and nut each spring is firmly locked to the base.

As is clearly indicated in Figure 4, the innermost convolutions 12 of the springs 5 are formed to provide a central channel, circular in cross-section. A stub shaft 13 is prepared so that one end thereof has an external diameter which will require a force fit to position it in the circular passage at the center of the spring. These parts may be so proportioned and prepared that when the stub shaft is forced into place, as indicated in Figure 2, the shaft and spring for all intents and purposes becomes a unitary structure, practically requiring destruction to effect a separation thereof.

At each side near each end of the screen box there is secured a bracket 14. This bracket in the case of a metal screen box may be welded thereto, or attached in a number of well known ways. Each bracket terminates in a split collar 15 forming a passage therethrough circular in cross-section of a diameter to receive the free ends of the stubs 13 in a snug fit when the split collar is not under stress. These collars adjacent the point of interruption are provided with a pair of parallel ears 16 and 17. These ears have a pair of aligned passages arranged to receive a nut and bolt 18 by means of which, as will be apparent, the collars 15 may be tightly clamped on the respective stubs. Thus it will be seen that by the construction described the springs with the attached stub shafts may be easily replaced or removed for repair when desired, and there can be absolutely no lost motion in the connections between the springs and the screen box. As is clear from the drawing, the end of the stub shaft engaging the spring is free from shoulders, slots, threads, nuts, and the like, and indeed of any separate device for uniting them.

In view of the fact that in the field after the parts have been assembled for a while there is a tendency for them to adhere together or stick, which condition results, for example, by rusting, one of the ears, such as the ear 17, is provided with a threaded passage 19 therethrough of a size so that when the bolt 18 is removed it may be screwed into this threaded passage 19 to a point where the end thereof engages the inner face of the ear 16 so that further movement of the bolt will spread the ears, opening up the collar sufficiently to break the engagement between it and the stub, facilitating its easy removal. It is, of course, apparent that this feature will permit the easy insertion of a new spring with its attached new stub even in the case of minor variations of stub size.

From the above description it will be apparent to those skilled in the art that the various features of this invention are subject to variation without departure from the novel subject matter thereof. We do not, therefore, desire to be strictly limited to the disclosure as given for purposes of illustration but rather to the scope of the appended claim.

What we claim is:

In a vibrating screen, the combination including a supporting base, a screen box, a plurality of involutely coiled springs for supporting said screen box from said base, each of said springs having a tangential tail detachably secured to said base and its innermost convolution shaped to form a passage of circular cross-section, a stub shaft having an end of circular cross-section of slightly larger diameter than that of said passage securely held in said passage solely by a forced fit, and means for detachably securing each of the stub shafts to said screen box.

GUSTAVE A. OVERSTROM.
GEORGE OVERSTROM.
CONRAD OVERSTROM.